250-203.R 56
Jan. 4, 1966 P. R. TIERNEY 3,226,971
COMPASS ALIGNMENT SYSTEM
Filed Dec. 6, 1962
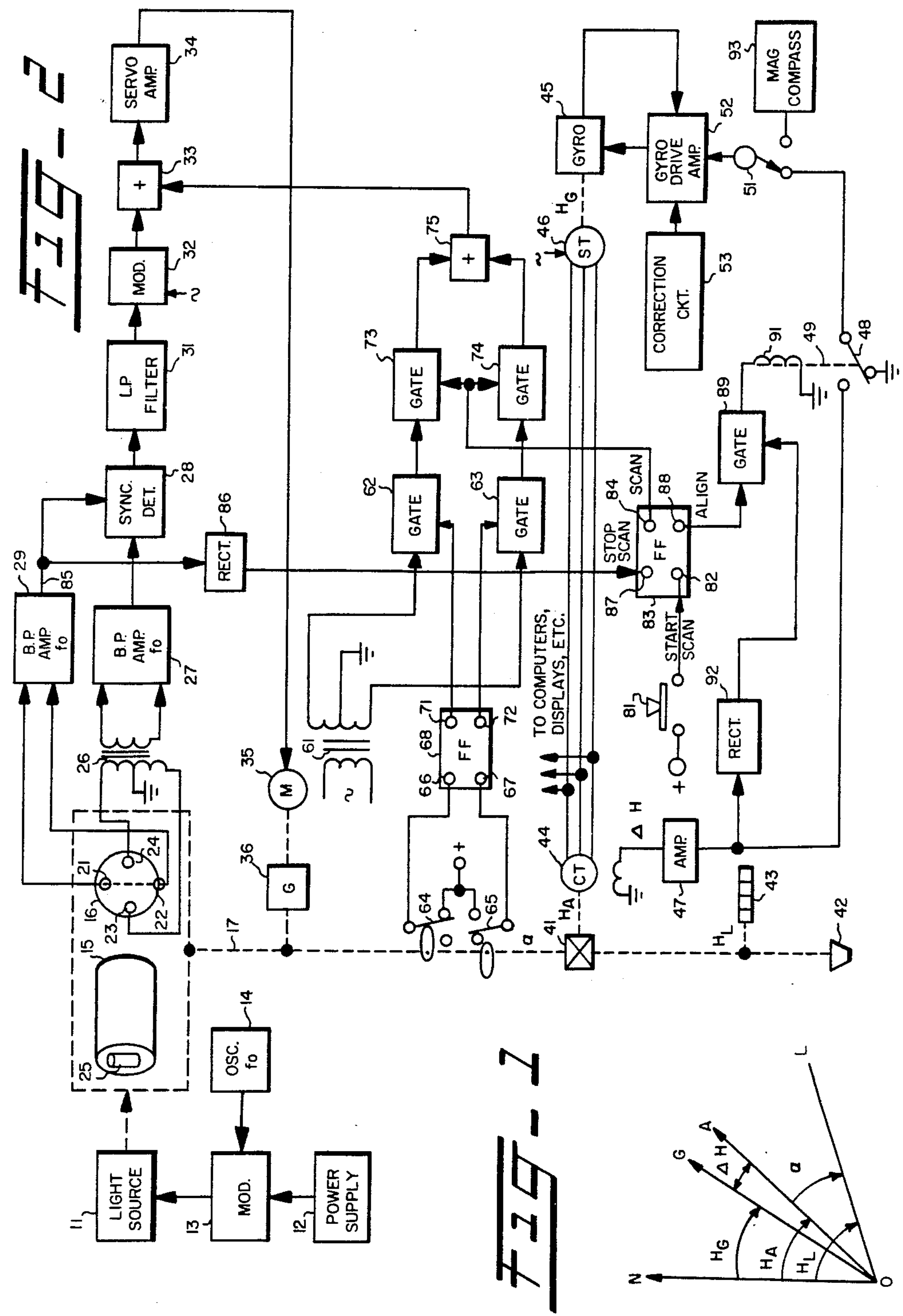

3,226,971
COMPASS ALIGNMENT SYSTEM

Peter R. Tierney, Pleasantville, N.Y., assignor to General Precision, Inc., a corporation of Delaware Filed Dec. 6, 1962, Ser. No. 242,816
4 Claims. (Cl. 73—1)

This invention relates generally to heading references as used in navigation systems and particularly to apparatus for initially adjusting such an instrument prior to a mission.

A heading reference is, in general, an instrument which determines continuously the azimuth of a reference line, usually the longitudinal axis, of a vehicle such as an aircraft. Heading references of many kinds are in use but the kind of particular interest for present purposes is a free gyroscope which tends to maintain its spin axis at a constant attitude with respect to inertial space. A free gyroscope is, of course, subject to random drift, that is, small but unpredictable changes in attitude, thereby making its directional indication increasingly unreliable with the passage of time. However, a free gyroscope is capable of acting as an extremely accurate heading reference for short periods. In order to take full advantage of its capabilities, the gyroscope should be carefully adjusted to indicate true north at the start of each mission.

In the past, the gyroscope has usually been aligned with the aid of a magnetic compass or flux valve. The magnetic heading data is fed to the azimuth gyroscope loop and is used to torque the gyroscope until its axis is aligned with true north as indicated by the compass. The magnetic information must, of course, be corrected for variation and deviation but these quantities are known only imprecisely because of the daily and seasonal changes in the earth's field, the necessity for interpolation from published maps and tables, and the presence of unknown local magnetic anomalies. This procedure not only lacks the desired degree of precision but involves a number of time-consuming manual operations.

Another approach to the problem which has been used in the past utilizes a line of sight on the ground the azimuth of which has been determined previously with surveying instruments to the required degree of accuracy. This approach employs a telescope equipped with cross hairs and mounted on the aircraft for rotation about a vertical axis. The telescope is manually sighted along the previously established line thereby determining the angle between the line and the longitudinal axis of the aircraft. Since the azimuth of the line is known, the heading of the aircraft, that is, the angle between true north and the longitudinal axis, is readily determined and the heading reference instrument is adjusted to indicate this angle.

The latter approach eliminates the necessity for accurate knowledge of the direction of the earth's magnetic field but still requires a number of manual operations which not only are time-consuming but which introduce opportunities for human error. Accordingly, it would be advantageous to perform the alignment automatically.

It is an object of the present invention to provide apparatus for automatically adjusting the heading reference instrument to indicate the true heading of the aircraft.

Another object is to provide apparatus for automatically determining the true azimuth of the longitudinal axis of an aircraft and for adjusting the heading reference instrument to indicate the azimuth.

Another object is to provide apparatus for automatically adjusting a heading reference instrument with the aid of a line of sight on the ground the azimuth of which has previously been determined.

Briefly stated, the invention requires that the aircraft be parked at a predetermined spot. A light source, preferably modulated to distinguish it from the ambient background light and other lights, is located a substantial distance, such as 600 yards or more, from the spot. The azimuth of the line joining the spot to the light is determined accurately. The aircraft is equipped with a telescope having a photoelectric sensor mounted in the focal plane and the assembly is rotatable about a vertical axis. A motor sweeps the telescope about its axis until the light source illuminates the sensor whereupon the signal generated by the sensor controls the motor so as to align the optical axis with the light source. The known azimuth of the line is combined with the indicated angle between the longitudinal axis and the line of sight to obtain the true heading angle which is compared with the heading angle as indicated by the gyroscope and the gyroscope is automatically adjusted to make these angles equal.

For a clearer understanding of the invention reference may be made to the following detailed description and the accompanying drawing, in which:

FIGURE 1 is a diagram illustrating the geometry of the problem; and

FIGURE 2 is a schematic diagram of the invention.

Referring first to FIGURE 1, an aircraft is parked at the position O with its longitudinal axis in some arbitrary direction OA. A light is positioned at the point L and the line joining the points O and L is at an azimuth angle $H_L$. A telescope mounted on the aircraft for rotation about a vertical axis may be directed toward the point L so as to indicate the angle between the aircraft axis and the line OL which angle is denoted $\alpha$. The angle $H_L$ is combined with the angle $\alpha$ to determine the true heading of the aircraft $H_A$. A gyroscopic compass mounted on the aircraft is assumed to indicate a heading angle $H_G$. The difference between the true heading $H_A$ and the indicated heading $H_G$ is denoted $\Delta H$. The apparatus of the present invention adjusts the indication of the gyroscopic compass to make the angle $\Delta H$ equal to zero.

Referring now to FIGURE 2, there is shown a light source 11 energized by a power supply 12 through a modulator 13. An oscillator 14, operating at a convenient frequency such as 2 kc, is also connected to the modulator so that the light source is amplitude modulated at the frequency $f_0$ of the oscillator.

Mounted on the aircraft is a telescope 15 which has a radiation-sensitive device 16 positioned in its focal plane. The telescope 15 and the sensor 16 are unitarily mounted for rotation about a vertical axis indicated schematically by the dotted line 17.

It is preferred that the sensor be of the kind which can supply two unidirectional voltages, the first being indicative of the total radiation falling up the sensitive area and the other having an amplitude and polarity indicative of the power and position of the centroid of an incident spot of light with respect to the vertical center line of the sensor and becoming zero when the spot is on the center line. One sensor of this kind which has been found to be suitable is designated a Radiation Tracking Transducer, type XY–20B RTT, may by Micro Systems, Inc., San Gabriel, California. This sensor is a solid-state semiconductor device that operates on a lateral photo effect, that is, electrons are caused to flow when photons (light) are incident on its surface. In this unit the first voltage appears across a first pair of terminals shown schematically in the drawing at 21 and 22, while the second voltage appears across another pair of terminals, similarly shown at 23 and 24.

If plots be made of the voltage at terminals 23 and 24 versus the horizontal, or X, displacement of a spot of light for a number of values of constant vertical, or Y, displacements, it is found that the points of zero voltage do not define a perfectly straight vertical line. In order to avoid alignment errors it is preferred that the telescope 15 have a cylindrical objective lens 25 to create an image which is a vertical line of light. By this expedient, the fact that the electrical center line of the transducer is not a straight line is averaged out.

Since the light source 11 is amplitude modulated, the voltage appearing across the terminals 21 and 22 has an alternating component in phase with and at the frequency $f_0$ of the oscillator 11. This voltage, which indicates by its amplitude the total amount of light reaching the sensor 16, is amplified by a bandpass amplifier 29 tuned to the frequency $f_0$, thereby accepting useful signals and rejecting other sources of light be they constant or random in their amplitude characteristics.

The voltage appearing across the terminals 23 and 24 likewise has an alternating component at the frequency $f_0$ but since the polarity of this voltage depends upon which side of the vertical center line is receiving the most light, the phase of the alternating component is indicative of the direction of misalignment of the telescope 15 with the light source 11. This component, after pasing through the transformer 26, is amplified by a bandpass amplifier 27 also tuned to the frequency $f_0$. The expedient of modulating the light source 11 and passing the signals through the bandpass amplifiers 27 and 29 makes sure that the instrument will respond only to the light source 11 and not to any extraneous sources.

The output of the amplifier 27 is connected to a synchronous detector 28 which is keyed by a voltage from the terminals 21 and 22 after amplification by an amplifier 29. The output of the synchronous detector 28 is therefore a unidirectional voltage the magnitude and polarity of which are indicative of the extent and direction of the deviation of the light spot from the center line. This voltage is smoothed by a low-pass filter 31 and applied to a modulator 32 to which is also applied a source of alternating current at a convenient power frequency such as 400 cycles so as to derive an alternating current the phase and amplitude of which represent the direction and extent of the deviation of the light spot from the center line. This voltage is passed through an adding circuit 33 to a servo amplifier 34 which controls a motor 35 connected through suitable gearing 36 to the shaft 17. It is obvious that the loop just described operates to position the telescope 15 with the light centered on the cell 16.

The shaft 17, the angular position of which is indicative of the angle $\alpha$, is connected to one input of a mechanical differential 41 another input of which is mechanically adjusted by means of a knob 42 to an angular position indicative of the azimuth of the light source, $H_L$, which is visually displayed on a counter 43. The output of the differential 41 indicative of the angle $H_A$ is connected to the rotor of a synchro control transformer 44. A free gyroscope 45, which indicates the angle $H_G$, is mechanically connected to the rotor of a synchro transmitter 46 the rotor winding of which is energized by a source of alternating current. The stator of the synchro control transmitter 46 is connected by a three wire cable to the stator of the control transformer 44, the rotor of which has induced therein a voltage indicative of $\Delta H$. This voltage is amplified by an amplifier 47 and connected to the contacts 48 of a relay 49. When these contacts are closed, that is, in the position opposite to that shown in the drawing, the signal indicative of $\Delta H$ passes through a manual switch 51 to a gyro drive amplifier 52 which generates a suitable voltage for application to the torquer of the gyroscope 45. A correction circuit 53, which generates voltages to correct the gyroscope for a number of deviations such as earth rate, is also connected to the gyro drive amplifier 52. It is obvious that the loop just described including the gyro drive amplifier 52, the gyroscope 45, the synchro transmitter 46 and the control transformer 44 operates to reduce $\Delta H$ to zero at which time the angle $H_G$ is equal to the angle $H_A$.

In general, the telescope 15 will not, at the start of operations, be directed toward the light source 11 and accordingly it is necessary to provide a circuit for sweeping or scanning the telescope until it is so directed. A transformer 61 has its primary connected to a source of alternating current and is provided with a secondary winding the center tap of which is grounded. Opposite ends of the secondary are connected to gate circuits 62 and 63, respectively. These circuits operate simply as switches and are controlled by voltages applied thereto. The shaft 17 is provided with two limit switches, 64 and 65, which are normally open but one of which is closed at either extreme limit of travel. A source of positive voltage is connected to both switches and the switches are connected to opposite input terminals 66 and 67, respectively, of a flip-flop circuit 68. This circuit has two output terminals 71 and 72 which are connected to control the gates 62 and 63, respectively. Normally both of the switches 64 and 65 are open but the flip-flop 68 is always in one or the other of its stable states so that at all times one of gates 62 and 63 is open. The output circuits of the gates 62 and 63 are connected to the inputs of additional gates 73 and 74, respectively, the outputs of which are in turn combined in a circuit 75 and then applied to the adding circuit 33. It is obvious that when the gates 73 and 74 are open, a voltage of one or the other phase from the transformer 61 will pass through one of the gates 62 and 63 and also through one of the gates 73 and 74 and then to adding circuits 75 and 33 to the servo amplifier 34, thereby causing the motor 35 to rotate the telescope 15. If one of the limits of travel of the telescope 15 is reached, one or the other of the switches 64 and 65 will be closed thereby applying a voltage to either terminal 66 or 67 which has the effect of closing that one of gates 62 and 63 which was previously open and opening the other one.

The remainder of the apparatus can most readily be described by considering the operation. It is first necessary to start the scanning operation and this is accomplished by momentarily closing the switch 81 which applies a positive voltage to an input terminal 82 of a flip-flop circuit 83. This causes a positive voltage to appear on one output terminal 84 which is connected to and controls both of the gates 73 and 74. Accordingly, the motor 35 starts to rotate the telescope 15. If the rotation is in a direction away from the light source 11, the telescope will reach one of its limits of travel thereby closing one of the switches 64 and 65 thereby reversing the direction of rotation. Eventually the telescope will be directed toward the light source 11 at which time a signal will appear on the terminals 21 and 22 of the sensor 16 and pass through the amplifier 29 to a conductor 85. A portion of this signal is rectified by a circuit 86 and applied to the input terminal 87 of the flip-flop 83. This removes the voltage from the terminal 84 thereby closing the gates 73 and 74 and applies a voltage to the terminal 88 which passes through a gate 89 and energizes the winding 91 of the relay 49.

The overall effect of this is to stop the scanning action of the motor 35 and to start the actual alignment procedure by closing the switch 48. The signal from the terminals 23 and 24 now passes through the previously mentioned chain of components to the servo amplifier 34 thereby controlling the motor 35 so as to align the telescope 15 precisely with the light source 11. At the same time the error signal ΔH from the control transformer 44 applies a signal to the gyro drive amplifier 52 which adjusts the gyroscope 45 until the error signal ΔH becomes zero. During the alignment a portion of the error signal from the output of the amplifier 47 is rectified by a circuit 92 and applied to the gate 89 so as to hold it open. However, when the alignment is completed, the error signal vanishes and there is no longer any voltage to hold the gate 89 open and accordingly it closes thereby releasing the relay 49, removing the error signal and grounding the input to the gyro drive amplifier 52. Alignment is now completed.

With the alignment completed as above described, the gyroscope 45 provides heading information of excellent accuracy which enables an aircraft to be directed to its target. The system is particularly suitable for short flight times not exceeding a few hours to the target. After the mission has been accomplished it may be that sufficient time has elapsed to render the heading information unreliable and accordingly provision is made for controlling or "slaving" the gyroscope to a magnetic compass 93 by operating the manual switch 51.

Although a specific embodiment of the invention has been described in considerable detail many modifications will occur to those skilled in the art. It is therefore desired that the protection afforded by Letters Patent be limited only by the true scope of the appended claims.

What is claimed is:

1. Apparatus for directing a telescope toward a predetermined point, comprising, motive means for rotating said telescope about an axis, a servo amplifier for controlling the rotation of said motive means in accordance with the magnitude and sense of a signal applied thereto, an adding circuit for combining two signals and applying the resultant to said servo amplifier, a voltage source for generating a first signal applied to said adding circuit whereby said motive means rotates said telescope, a light source at said point, a radiant energy sensor positioned in the focal plane of said telescope for generating both a second signal indicative of the portion of said sensor which is illuminated and a third signal indicative of total illumination, means for generating from said second signal a fourth signal suitable for controlling said servo amplifier and for applying said fourth signal to said adding circuit, and means responsive to the generation of said third signal for removing said first signal from said adding circuit, whereby said motor is controlled by said third signal.

2. Apparatus for aligning the optical axis of a telescope with a line of known azimuth, comprising, a light source positioned on said line a substantial distance from said telescope, said telescope being mounted for rotation about an axis lying in the vertical plane through said line, said telescope including a vertically aligned cylindrical objective lens, whereby when said telescope is directed toward said source a vertical line image of said source is formed in the focal plane of said telescope, a radiant energy sensor mounted in said focal plane for generating a first signal indicative of the horizontal displacement of said image from the vertical center line of said focal plane, a servo mechanism for rotating said telescope in accordance with signals applied thereto, a voltage source for generating a second signal, means for initially applying said second signal to said servo amplifier whereby said telescope starts to rotate, and means responsive to illumination of said sensor for disabling said second signal and controlling said servo amplifier by said first signal.

3. Apparatus for aligning the optical axis of a telescope with a line of known azimuth, comprising, means for mounting said telescope for rotation about an axis lying in the vertical plane through said line, a radiant energy sensor mounted in the focal plane of said telescope for generating first and second unidirectional voltage signals, the magnitude of said first signal being indicative of the total amount of light falling on said sensor, the polarity and magnitude of said second signal being indicative of the direction and extent of the displacement of the centroid of illumination from the vertical center line, a light source positioned on said line a substantial distance from said telescope, means for modulating the light emitted by said source, whereby when said telescope is directed toward said source said signals have an alternating component, means for synchronously detecting said second signal with the aid of said first signal as a reference thereby generating a third signal, modulating means for deriving a fourth signal from said third signal, a servo mechanism for rotating said telescope, an alternating current source for generating a fifth signal, an adding circuit for combining said fourth and fifth signals and applying the resultant to said servo amplifier, whereby when said telescope is not aligned with said source said fifth signal causes said telescope to rotate, and means responsive to the generation of said first signal for disconnecting said fifth signal, whereby said fourth signal controls said servo mechanism to align said telescope with said light source.

4. Apparatus for adjusting a gyroscopic compass to indicate the true heading of the vehicle on which it is installed, comprising, a light source positioned on a line of known azimuth intersecting said vehicle, a telescope mounted on said vehicle and rotatable about a vertical axis which axis intersects said line, a radiant energy sensor mounted in the focal plane of said telescope for generating signals indicative of the power and position of the centroid of the incident illumination, a servo mechanism for rotating said telescope in accordance with signals applied thereto, a first shaft rotatable with said telescope the angular position of which represents the angle between the longitudinal axis of said vehicle and the optical axis of said telescope, a second shaft angularly positioned to represent the known azimuth of said line, means for combining the angular positions of said first and second shafts so as to position a third shaft at an angle indicative of the true heading of said vehicle, a fourth shaft connected to said compass for indicating the angle between an element of said compass and said longitudinal axis, means for generating an error signal indicative of the difference in the angular postions of said third and fourth shafts, alignment means for adjusting the angular position of said fourth shaft in accordance with a signal, means for combining two signals and appling the resultant to said servo mechanism, means for deriving a position signal from said sensor and applying it to said combining means, a source of voltage which, when applied to said servo amplifier, causes said telescope to rotate continuously.

manually operable means for initially connecting said source of voltage to said combining means, and means responsive to illumination of said sensor for disconnecting said source of voltage and for applying said error signal to said alignment means.

References Cited by the Examiner

UNITED STATES PATENTS

| | | | |
|---|---|---|---|
| 2,070,178 | 2/1937 | Pottenger et al. | 250—203 X |
| 2,539,482 | 1/1951 | Rothschild | 33—222 X |
| 3,037,289 | 6/1962 | Garbarini et al. | 33—222 |
| 3,127,516 | 3/1964 | Ammerman et al. | 250—203 |

LOUIS R. PRINCE, *Primary Examiner.*